No. 773,642. PATENTED NOV. 1, 1904.
J. T. & G. W. HAYDEN.
VALVE.
APPLICATION FILED MAR. 31, 1904.
NO MODEL.
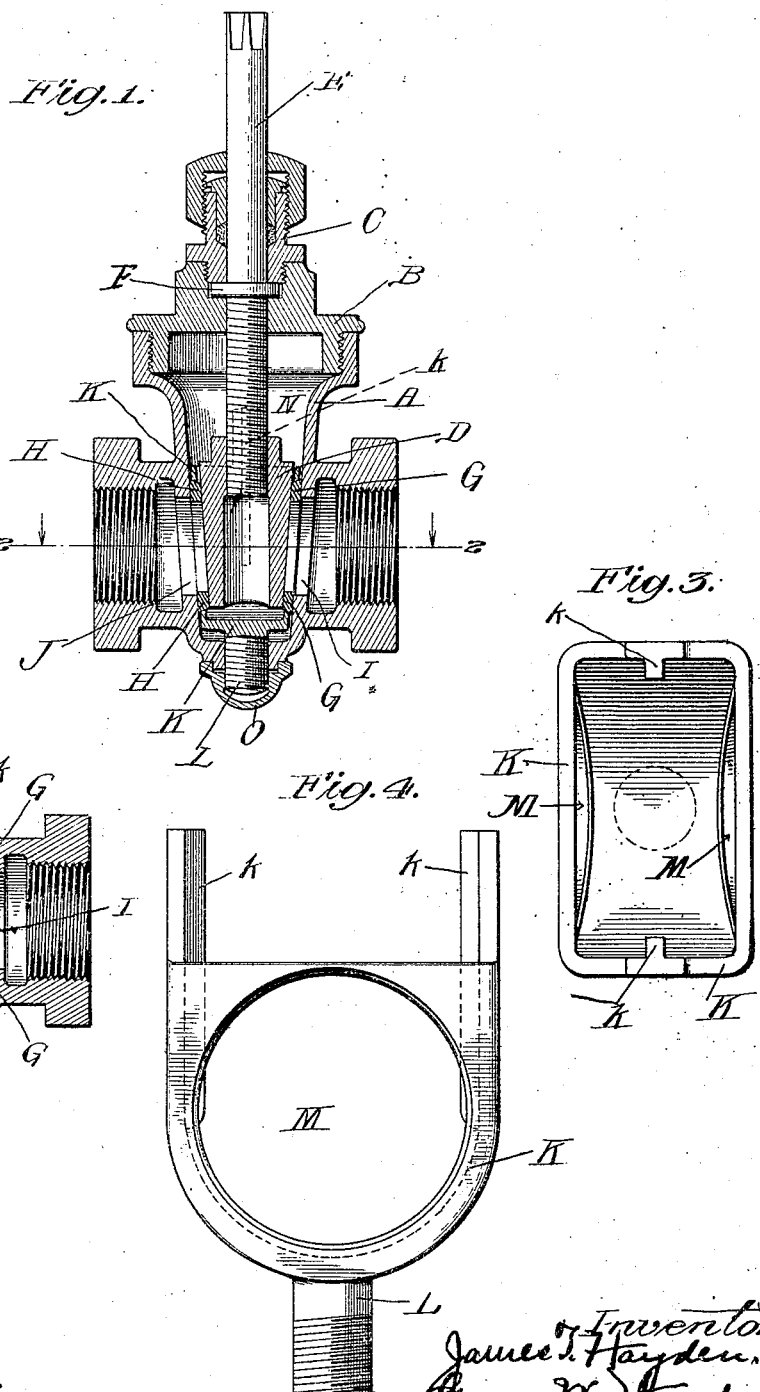

No. 773,642. Patented November 1, 1904.

UNITED STATES PATENT OFFICE.

JAMES T. HAYDEN AND GEORGE W. HAYDEN, OF OAK PARK, ILLINOIS, ASSIGNORS TO CRANE COMPANY, OF CHICAGO, ILLINOIS, A CORPORATION OF ILLINOIS.

VALVE.

SPECIFICATION forming part of Letters Patent No. 773,642, dated November 1, 1904.

Application filed March 31, 1904. Serial No. 200,959. (No model.)

*To all whom it may concern:*

Be it known that we, JAMES T. HAYDEN and GEORGE W. HAYDEN, citizens of the United States, residing at Oak Park, in the county of Cook and State of Illinois, have invented certain new and useful Improvements in Valves, of which the following is a specification.

Our invention relates to improvements in valve structures, and is especially adapted for use in connection with devices of the wedge-valve type.

The object of our invention is to provide a simple and effective means for removably securing the valve-seats in position, so that when the valve-seats are worn out or injured they may be quickly and readily replaced, thus obviating any necessity for discarding the entire valve, and thus saving the annoyance, time, and expense of removing the valve and replacing it with a new valve. These and such other objects as may hereinafter appear are attained by the devices which are typically illustrated in the accompanying drawings, in which—

Figure 1 is a vertical sectional view through a wedge-valve fitted with our improvements. Fig. 2 is a sectional view on the line 2 2 of Fig. 1. Fig. 3 is an enlarged plan view of the cage. Fig. 4 is an enlarged elevation thereof.

Like letters of reference indicate similar parts in the several figures of the drawings.

A is the valve-casing, fitted with a cap B and the usual stuffing-box C.

D is the wedge-valve, which is threaded to the valve-stem E, the stem E being rotatively secured within the structure by means of a collar F, all of familiar form. The valve D is adapted to be seated against the valve-seats G H, which are preferably annular in form and arranged, respectively, to surround the ports I J, which lead from the interior of the valve.

As valves are commonly constructed the valve-seats are either formed integrally with the valve-casing, so that in case of injury to the seats the entire valve must be discarded, or they are threaded into the valve-casing or otherwise so secured that it is a matter of much difficulty to remove them, especially after they have become corroded in place, so that the entire valve structure must be disconnected and removed before the valve-seats can be taken out. To obviate these difficulties, we provide a casting, which we call a "cage," K, which may be made of malleable iron or other inexpensive metal. This cage K is provided with a threaded stem L and with ports M, which register substantially with the ports I J. Surrounding the ports M the cage K is provided with seats, which preferably taper inwardly and which are adapted to receive the valve-seats G H, which are preferably of annular iron. The inner walls of the valve-chamber N taper, as shown, and the bottom of the valve-chamber is provided with an opening extending through the casing A for the passage of the stem L on the cage K. The cage K, with the seats G H mounted in place, is inserted through the top of the valve into the valve-chamber N, the stem L extending through the bottom of the valve-chamber. A nut O is threaded upon the projecting end of the stem L and draws the cage K downwardly within the tapered walls of the valve-chamber N. The seats G H, which project beyond both the inner and outer faces of the cage K, are thus wedged tightly between the tapered walls of the valve-chamber N and the seats provided for them on the cage K and are thus rigidly secured in place surrounding the ports I J and make a steam-tight joint between the seats G H and the casing A.

The cage K is provided with vertically-extending guides *k*, and the valve D is provided with corresponding guideways, so that as the stem E is rotated the valve D is reciprocated upon the guides *k*.

In case of injury to the valve D the cap B is unscrewed and lifted away from the casing A, carrying with it the stem E and the valve D. Thereupon the valve D can be unscrewed from the stem E and replaced with a new valve. If, on the other hand, either or both of the valve-seats G H becomes injured, it is only necessary to remove the cap B, as before, and then after removing the nut O from the end of the stem L the cage K, carrying the seats G H, may be lifted out of the valve-chamber N. This removal will be simplified, because the seats G H will be seated within the tapering walls of the valve-chamber N, and by striking the projecting end of the stem L the seats G H will be loosened from the casing A and the cage carrying the seats may be readily removed, whereupon the damaged seats may be taken from the cage and replaced with new seats and the cage and valve reassembled, as before, all without uncoupling the valve-casing, with but a trifling delay, and involving only a slight expense as against the delay and expense ordinarily incident to removing and discarding the entire valve-casing and replacing the same with an entirely new valve.

While we have shown our invention in its preferred form and while we consider it especially adapted for use in connection with a wedge-valve, it is obvious that our invention may be adapted to various conditions as a matter of convenience or shop expediency without departing from the fundamental principles of our device. Consequently all such variations are contemplated by our invention. Thus the cage may be provided with the valve-seats in any suitable or convenient manner, and it is within the spirit of our invention if the valve-seats be formed integrally with the cage.

We claim—

The combination with a casing provided with a valve-chamber having tapering walls and provided with ports leading therefrom, of a cage mounted within said valve-chamber and provided with ports adapted to register with the ports leading from said valve-chamber, and provided also with tapered seats surrounding said ports, a removable valve-seat clamped between each of said tapered seats and the converging walls of said valve-chamber, means for tightening said cage against said valve-seats, guides upon said cage, said guides being located centrally of the edges of the cage and extending above the top of the same, and a valve mounted to reciprocate upon said guides and to seat against said valve-seats, said valve having grooves in its sides to receive the said guides.

JAMES T. HAYDEN.
GEORGE W. HAYDEN.

Witnesses:
F. H. Drury,
M. E. Shields.